United States Patent [19]

Hultberg

[11] 3,847,025

[45] Nov. 12, 1974

[54] DYNAMIC TIRE BALANCING METHOD AND APPARATUS

[76] Inventor: Richard M. Hultberg, 11 Boulevard de Empereur, Brussels, Belgium 1000

[22] Filed: Apr. 4, 1973

[21] Appl. No.: 347,741

[52] U.S. Cl. ......................... 73/460, 73/475, 73/487
[51] Int. Cl. ......................... G01m 1/04, G01m 1/16
[58] Field of Search ............. 73/460, 459, 462, 471, 73/472, 473, 475, 476, 477, 66, 487

[56] References Cited
UNITED STATES PATENTS

| | | | |
|---|---|---|---|
| 1,557,268 | 10/1925 | Newkirk | 73/479 |
| 2,442,308 | 5/1948 | Meredith et al. | 73/471 |
| 3,077,781 | 2/1963 | Silver | 73/465 |
| 3,147,624 | 9/1964 | Trimble | 73/462 |

Primary Examiner—James J. Gill
Attorney, Agent, or Firm—Browne, Beveridge, DeGrandi & Kline

[57] ABSTRACT

A method and apparatus for dynamically balancing wheels in which a wheel is mounted on a cradle means which is connected to a maximum-displacement indicator. The wheel is rotated and the maximum displacement of the cradle means is noted. A pair of known trial weights are successively placed at three positions on the wheel rim 120° apart and the wheel is rotated and the maximum displacement noted after each placement. On the basis of the magnitude of the known weight and the maximum displacements measured a calculating device comprising a triangular member, three longitudinally extending measuring members and an angle measuring member is used to calculate the magnitude and angular locations of the proper offsetting weights.

12 Claims, 11 Drawing Figures

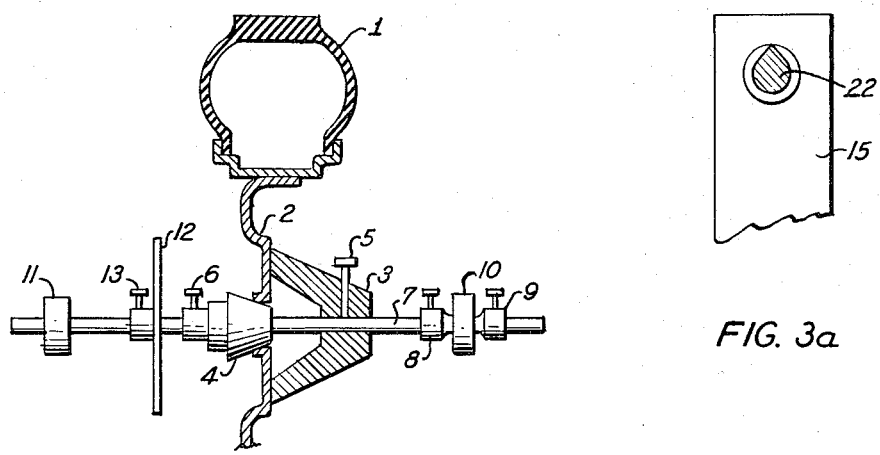
FIG. 1
FIG. 3a
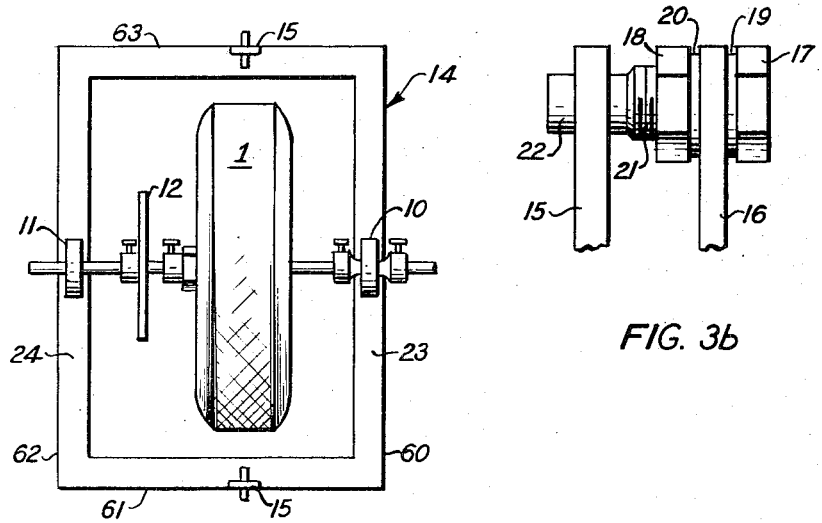
FIG. 2a
FIG. 3b
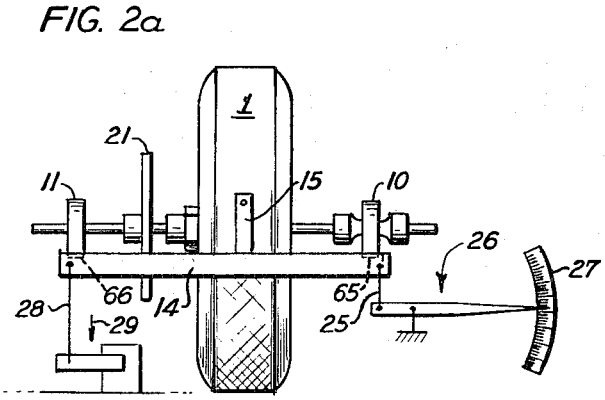
FIG. 2b

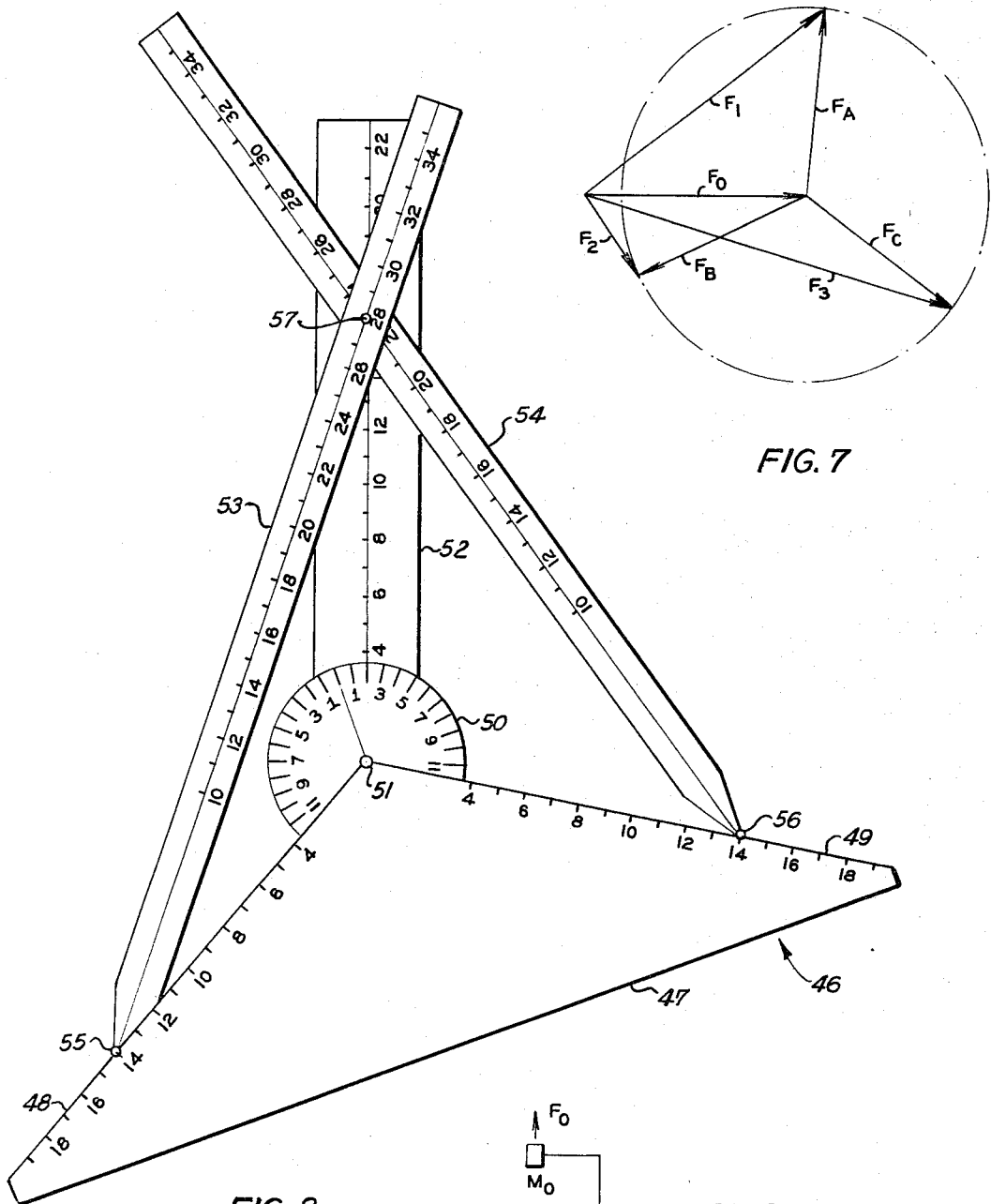
FIG. 7
FIG. 8
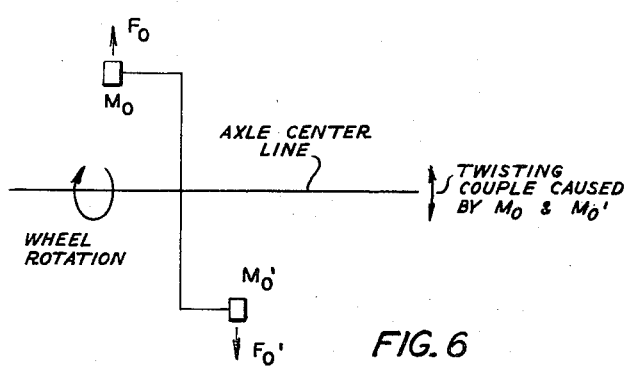
FIG. 6

DYNAMIC TIRE BALANCING METHOD AND APPARATUS

This invention relates to a method and apparatus for determining the dynamic imbalance of a wheel.

There are ordinarily two components of imbalance in a wheel which it is necessary to compensate for. One is radial imbalance in a plane perpendicular to the axle which causes mass eccentricity of the wheel. This type of imbalance is very easy to detect and may, for instance, be detected by mounting the wheel on a low-friction axle so that the wheel comes to rest with its heavy point at the bottom. A balance of appropriate size can then be applied at a point on the wheel rim opposite the heavy spot so that the wheel remains motionless no matter what position it is initially placed in. The above technique is well known and is not the subject of this invention, although it is a necessary first step in virtually all wheel balancing methods.

The second component of wheel imbalance consists of a tilting of the rotational mass plane of the wheel from the normal position perpendicular to the axle. The effect of imbalance of this factor is often referred to as "wobble" or "shimmy" and can become very pronounced at high speed. It is unsafe, as well as causing excessive tire and suspension wear and radial tires are particularly sensitive to this form of imbalance.

The rotational imbalance of a wheel is difficult to correct. It must be done by an instrument capable of rotating the wheel at a velocity which is sufficient to measure the force imbalance and it must include a means of accurately establishing the exact wheel rotational angle representing the line of maximum axial tilt. Currently available apparatus for this purpose are typically large, heavy, complex and expensive. Many such apparatuses are also difficult to operate and require a relatively high level of operator skill.

It is therefore an object of the invention to provide a relatively inexpensive, relatively error-free method and apparatus for dynamically balancing wheels.

The above object is accomplished by providing a cradle means which is pivotally mounted for movement in a given direction. The wheel to be balanced is mounted on an axle, which is in turn mounted on the cradle means. The cradle means is connected to a displacement indicator which measures only the maximum displacement of the cradle means and the cradle means is further connected to a damping means which makes operation over a range of rotational speeds possible. The wheel is rotated and the maximum displacement of the cradle means is noted. A pair of known weights is then placed on the wheel rim at three positions 120° apart and the wheel is rotated after each placement and the maximum deflection of the cradle means is noted. A calculating device is then used to derive from the value of the known weights and the maximum displacements noted both the value and the position of a pair of weights which will compensate for the rotational imbalance.

The invention will be better understood by referring to the detailed description below in conjunction with the drawings in which:

FIG. 1 shows how the wheel is mounted on the axle,

FIG. 2a is a top-view of the wheel and axle mounted on the cradle means,

FIG. 2b is a front-view of the wheel and axle mounted on the cradle means,

Figure 4:
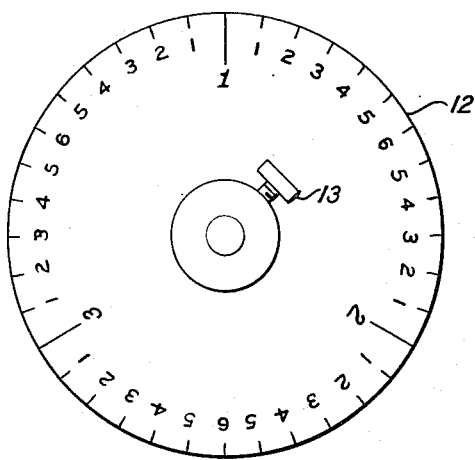
Figure 5A:
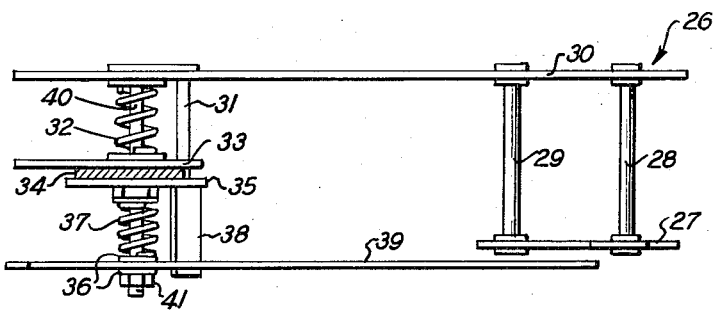
Figure 5B:
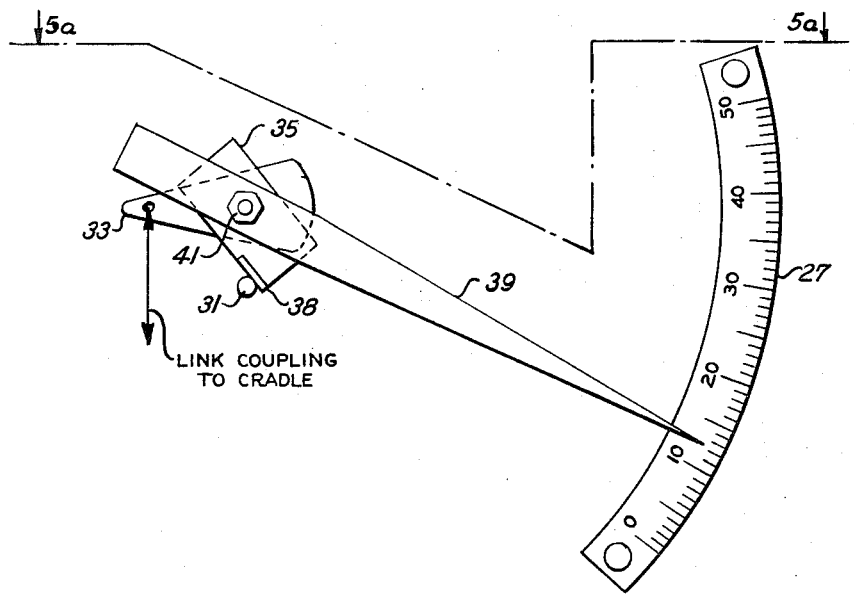

FIG. 3a is a detailed cross-sectional view of a mounting member of the cradle means, FIG. 3b is a side-view of the mounting member of FIG. 3a mounted on a pivot stud which is fixedly attached to a support member, FIG. 4 shows a calibration disk used in conjunction with the invention, FIG. 5a is a diagram of the maximum deflection indicator of the invention, FIG. 5b is a front-view of the maximum deflection indicator of FIG. 5a, FIG. 6 is a diagramatic representation of the twisting couple caused by the dynamic imbalance of the wheel, FIG. 7 is a vector diagram useful in explaining the principle of the invention, FIG. 8 shows a calculating aid which is used to determine the parameters of the vectors of the diagram of FIG. 7.

FIGS. 1 and 2 show how the wheel is mounted on the cradle means of the invention. In FIG. 1, wheel 1 is mounted on axle 7 and secured thereto by universal wheel centering and clamping device, 3,4. Parts 3 and 4 are slidable on axle 7 and as shown in FIG. 1, have surfaces which may abut wheel 2 and hold it securely to the axle when screws 5 and 6 are tightened. Because relatively low rotational velocities are used in the practice of the invention, the wheel centering and clamping device 3,4 is simpler than is typically used on other dynamic imbalance determining machines. Axle 7 further has mounted thereon extremely low-friction ball bearings 10 and 11. The position of bearing 10 on axle 7 may be adjusted with the use of collars 8 and 9. While bearing 11 is shown fixed in its longitudinal position on the axle, if desired its position also may be adjustable by the use of adjustable collars such as 8 and 9.

A calibration disk 12 shown in detail in FIG. 4 is also mounted on the axle adjacent to wheel 1. Calibration disk 12 is attached to its own adjusting collar and the position of disk 12 may be fixed by tightening screw 13. As shown in FIG. 4, disk 12 is divided into 10° increments with the points 0°, 120°, and 240° being prominently marked as large 1, large 2 and large 3 in FIG. 4. The function of the calibration disk will be described in greater detail below.

As shown in FIGS. 2a and 2b, the axle assembly is mounted on cradle means 14. In the preferred embodiment of the invention, cradle means 14 is comprised of a rectangular frame member having side members 60, 61, 62 and 63. At least members 60 and 62 have slots therein for accomodating bearings 10 and 11. The depth of the slots is shown in FIG. 2b. The adjusting collars 8 and 9 permit the axle to be shifted on the cradle means to bring it into balance. It is desirable for the axle, the wheel clamp, and cradle means to have as low a mass as is consistent with the required rigidity. It is noted that according to the preferred embodiment of the invention, the bearings are simply placed into the slots of the cradle means and no supporting clamps are necessary. This permits easy and rapid assembly of the axle to the wheel off the machine where it is easier to do.

The cradle means is suspended from a test table or other suitable support means (not shown) by cradle suspension brackets 15 shown in greater detail in FIGS.

3a and 3b. Each of cradle suspension brackets 15 has a hole therein near the top and low-friction pivot stud 22 which is fixedly attached to support bracket 16 is disposed therein. In FIG. 3b low-friction pivot stud member 22 is shown as being the end part of a threaded member 21 which is secured to support bracket 16 by nuts 17 and 18 and washers 19 and 20. Support bracket 16 is rigidly secured to a test table or other rigid support means. Hence, cradle suspension brackets 15 and the cradle means 14 are free to pivot about pivot studs 22.

The pivots are displaced a small distance above the axle as shown in FIG. 2b so that the wheel axle and cradle means form a compound pendulum. The distance between the pivot studs and the axle is determined by the requirement for the resonant frequency of the system to be well below the range of frequencies (wheel rotation periods) used in operation but the distance should not be so large that the sensitivity of the machine is unnecessarily reduced. The ideal distance for any given machine can be determined by experimentation.

The outer edge of the cradle means is connected by member 25 to an indicator 26 which measures the peak deflection of the pendulum. In its simplest form the indicator is a very low mass direct acting pointer with a mechanical amplification of between 10 and 15. A preferred embodiment of the deflection indicator in which the value of the maximum detection is retained until re-set is shown in FIGS. 5a and 5b.

Indicator 26 is comprised of a back member 30 attached by means of two posts 28 and 29 to a front scale member 27 having unit demarcations thereon. Actuating member 33 is connected to the cradle means by member 25 which is shown in FIG. 2b. Actuating member 33 is disposed on shaft 40 and spring 32 is located between member 33 and back member 30. Friction clutch means 34, such as a friction washer assembly, is located between actuating member 33 and motion transmitting member 35. The friction between members 33 and 35 is arranged to be great enough so that member 35 moves when member 33 is moved, but not so great so as to be a load on the movement of the cradle means. Motion transmitting member 35 has a rectangular projection portion 38 projecting therefrom. Pointer 39 is disposed on shaft 40 by means including nut 41, friction washers 36 and spring 37. The friction between pointer 39 and motion transmitting member 35 is arranged to be much less than the friction between actuating member 33 and motion transmitting member 35. Cylindrical stop 31 is fixedly attached to back member 30. Referring to FIG. 5b, the pointer is initially set at zero. Movement of the cradle means in the downward direction will cause the left part of member 33 to move downwardly. This motion will be transmitted to member 35 through friction clutch 34 and the left-hand portion of member 35 will move downwardly while the right-hand portion will move upwardly. Projection member 38 of member 35 contacts pointer 39 in its upward movement and moves the pointer a distance up the scale 27 corresponding to the maximum deflection of cradle means 14. When the cradle means begins to reverse its direction and move upwardly, the left-hand portions of members 33 and 35 also move upwardly and the right-hand portion of member 35 moves downwardly. Since the friction is relatively low between member 35 and pointer 39, pointer 39 remains in the position of maximum deflection and does not move downwardly. Hence, deflection indicator 26 will indicate the value of maximum deflection until it resets.

An outer edge of the cradle means is also linked by member 28 to an adjustable damping means which is used to control the damping factor of the system. The damping means 29 is an adjustable motional resistance which can be implemented in a number of well-known ways. For instance, damping means 29 could be a dashpot.

When the wheel 1 is rotated an imbalance in the nature of a tilting of the rotational mass plane of the wheel will cause the pendulum to oscillate and the maximum deflection will be indicated on scale 27. The pendulum is sufficiently sensitive so that very low wheel rotational velocities can be used and the wheel can be spun by hand at one to two revolutions per second which is sufficient to detect imbalance rotational couples equivalent to that caused by a pair of quarter to half ounce weights at the wheel rim.

The force caused by the wheel imbalance increases with the square of the rotational velocity. However, it can be shown for this condition for rotational frequencies above the system resonant frequency that the deflection can be held relatively constant over a wide range of rotational velocities if the system damping factor is adjusted to the proper value. It is the function of damping means 29 to correct the over-all damping factor and damping means 29 should be adjusted to the value which provides the most constant deflection over a range of rotational velocities. Because the angular deflection of the pendulum over its maximum usable range is relatively low, for practical purposes the deflection may be considered to be linear so that the deflection is directly proportional to force imbalance. Because the cradle and rotating wheel assembly consititutes a resonant system which is excited above its resonant frequency, there is a significant phase displacement between the oscillation of the cradle and the wheel imbalance force. Consequently, it is not useful to detect the angular position of the axle where the maximum deflection occurs as is done in some other methods, although this could readily be done. It is further noted that the location of the cradle balance points eliminates any effects of residual static or radial imbalance as a source of error.

The novel method according to the invention for determining the dynamic imbalance will now be described. The method is essentially a feed-back method which employs a minimum set of trial solutions. In FIG. 6, the imbalance which it is necessary to correct can be represented by a pair of identical masses $M_0$ and $M'_0$ of unknown magnitude which are separated by an unknown distance parallel to the axis. The masses are located at the same radial distance but displaced 180° from each other and form a twisting couple parallel to the axle when the wheel is rotated. The twisting couple, the direction of which is shown in FIG. 6 can be balanced out by locating another pair of masses of the same moment in opposition.

To simplify the explanation, let us consider first only the forces acting on one face of the wheel. What occurs on one face of the wheel must also occur on the other face, but displaced 180° to retain radial balance. The rotating mass $M_0$ of FIG. 6 causes a force $F_0$ in the vector diagram of FIG. 7. At this point, neither the magnitude nor the location of the equivalent mass causing $F_0$ is known. According to the invention, a pair of trial weights of known magnitude are placed on the wheel rim at three positions 120° apart and the maximum deflection caused by the weights at each position is noted. For convenience the trial weights may be magnetically attachable. With the aid of the calculating device shown in FIG. 8, the mass and location of weights necessary to compensate for the dynamic imbalance is determined.

The wheel is first rotated without any trial weights thereon, and the maximum deflection is noted. As stated above, the rotating mass $M_0$ which is due to the inherent imbalance of the wheel causes a force $F_0$ in the vector diagram of FIG. 7, neither the magnitude nor the location of which is known. One weight of the pair of known weights is first attached to the wheel at a position corresponding to the large numeral 1 of calibration disk 12, while the other weight is attached at a position on the other face 180° therefrom. The wheel is rotated and the maximum deflection is noted. In the vector diagram of FIG. 7, the vector $F_A$ reperesents the force of one trial weight acting by itself and the vector $F_1$ represents the force due to the resultant of the force due to the inherent imbalance of the wheel $F_0$ and the force due to $F_A$. The pair of trial weights is then moved to a position corresponding to the large numeral 2 on calibration disk 12, 120° displaced from the first position. The wheel is rotated again and the maximum deflection is noted. Since the same weights are used for all of the trials, the magnitude of the vector representing the force due to one of the second trial weights is equal in magnitude to vector $F_A$ but is 120° displaced therefrom in a clockwise direction and is shown as vector $F_C$ in FIG. 7. The vector $F_3$ represents the force due to the resultant of the inherent imbalance of the wheel $F_0$ and the force $F_C$. A third trial is made by displacing the position of the weights 120° in a clockwise direction again to correspond to the position of large numeral 3 on the calibration disk, rotating the wheel, and noting the maximum displacement value on scale 27. The vector due to the one of the third trial weights is displaced 120° from the vector representing the force due to one of the second trial weights, is equal in magnitude thereto and is represented in FIG. 7 as vector $F_B$. Vector $F_2$ is the resultant of vectors $F_0$ and $F_B$ and represents the force due to the combination of the inherent imbalance of the wheel and the force due to the trial weight situated in its third trial position.

The exact position and magnitude of a mass to exactly off-set $F_0$ is determined with the use of a calculating device. While a suitable device could be implemented in a number of different ways, a preferred embodiment thereof is illustrated in FIG. 8. This embodiment is comprised of four pieces, all of which have linear graduations to the same scale. The apex of triangular member 47 is connected to the O demarcation point of longitudinally extending rectangular member 52 by means of a pivot pin 51. There is a hole at each demarcation of member 52 into which another pivot pin can be placed. Longitudinally extending members 53 and 54 are identical rods which have holes at the demarcation points and which are attachable and detachable to member 52 by means of pivot pin 57. The O point of each rod 53 and 54 has a large pin shown as 55 and 56 respectively permanently fastened thereon. Triangular member 47 has angle measuring device 50 rigidly attached thereto at its apex so that angle measuring device 50 rotates when triangular member 47 rotates.

In order to calculate the position and magnitude of the proper off-setting mass, the pivot pin 57 is placed in member 52 at the point corresponding to the maximum deflection corresponding to the vector $F_0$ or the maximum deflection noted when the wheel was rotated without any additional weights thereon. The smallest of the three maximum deflections noted with the known weights on the wheel is ignored and the two largest maximum deflection values are set in rods 53 and 54 by placing the holes at the demarcations corresponding to the two largest maximum deflections on the pivot pin 57 previously located in member 52. The two permanent pins at the zero points of rods 53 and 54 are then brought to bear against edges 48 and 49 of triangular member 47 as shown in FIG. 8. Member 47 is rotated until the two pins on rods 53 and 54 register equal values on the scales of edges 48 and 49. The calculating device 46 has thus been caused to simulate the vector diagram of FIG. 7 with member 52 corresponding to $F_0$, member 54 corresponding to $F_1$, and member 53 corresponding to $F_3$. The edges 48 and 49 of triangular member 47 correspond to $F_C$ and $F_A$ respectively.

It is now a simple matter to solve the vector diagram for the magnitude and location of $F_0$.

$$\frac{F_0}{\text{Maximum deflection due to } F_0} = \frac{\text{Known weight}}{\text{Maximum deflection due to } F_A}$$

$$F_0 = \frac{\text{Known weight} \times \text{maximum deflection due to } F_0}{\text{Maximum deflection due to } F_A}$$

$$F_0 = \frac{\text{Known weight} \times \text{value set in member 52}}{\text{Value set on scale of edges 48 and 49}}$$

The position for the angular location of the corrective weights is indicated by angle measuring device 50, which indicates the angle between $F_B$ and $F_0$ in FIG. 7. The position for one of the corrective weights is thus an angular distance away from the smallest trial weight position equal to the angle indicated by device 50 and is always in a direction away from the largest measurement. The other corrective weight is located 180° from the position of the first corrective weight. Thus both the magnitude and location of the required corrective weights can be determined independently of wheel diameter, rim width, and total wheel/tire weight.

While I have disclosed and described the preferred embodiments of my invention, I wish it understood that I do not intend to be restricted solely thereto, but that I do intend to include all embodiments thereof which would be apparent to one skilled in the art and which come within the spirit and scope of my invention.

I claim:

1. A method of determining the dynamic imbalance of a wheel comprising the steps of;
   mounting said wheel for rotation about its center,
   suspending said wheel from a support means which is pivotally mounted about an axis which is parallel to a face of said wheel,
   rotating said wheel about its center,
   measuring the pivotal displacement of said support means which displacement is due to the dynamic imbalance of said wheel being rotated,
   successively placing a pair of weights of known value at three different pairs of locations about the periphery of said wheel, said pairs of locations being spaced 120° from each other, and after each such placement rotating said wheel about its center and measuring the total pivotal displacement of said support means which total displacement is due to the rotational imbalance of said wheel and the imbalance produced by each pair of weights, determining the theoretical displacement of said support means due to the imbalance of said wheel which is caused by a pair of said known weights acting by itself, and deriving from said theoretical displacement and said known value of said weights the proper balancing weight and proper location necessary to compensate for said rotational imbalance.

2. The method of claim 1 wherein said proper balancing weight is determined by multiplying said known value by a factor equal to said displacement due to the rotational imbalance of said tire divided by said theoretical displacement.

3. The method of claim 2 wherein said step of deriving said proper locations for said balancing weights includes the step of determining the angle between the force vector corresponding to one of said pair of weights of know value acting by itself and the force vector corresponding to the total of that force vector and the force vector due to said rotational imbalance.

4. The method of claim 3 wherein said wheel is rigidly mounted on an axle passing through its center and wherein said support means is a cradle means pivotable about said axis, said axle and wheel further being placed on said cradle means so that axis passes through a central plane of said wheel.

5. The method of claim 4 wherein said wheel, axle, and cradle means comprise a compound pendulum.

6. The method of claim 5 wherein said displacements are measured by peak displacement indicator.

7. The method of claim 5 wherein said cradle means is connected to an adjustable damping means.

8. A device for use in the method of determining the dynamic imbalance of a wheel recited in claim 1 comprising; a plane triangular member having demarcations to a given scale along two edges which meet at an apex, first plane elongated member having demarcations to said same scale thereon being mounted at said apex for pivotal movement in a plane parallel to the plane of said triangular member, and two similar elongated plane members having demarcations thereon to said same given scale which are pivotally attachable to said first elongated member at the positions of the demarcations on said similar members and in a plane parallel to said first elongated members so that said similar members are pivotally moveable in a plane parallel to said triangular member with one end of each of said similar members resting on one of said edges of said triangular member.

9. The device of claim 8 wherein the interior angle defined by said apex is 120°.

10. The device of claim 9 wherein said triangular member has an indicating means attached thereto for indicating the angular relationship between said triangular member and said first elongated member.

11. The device of claim 8 wherein said similar members are pivotally attachable to said first elongated member by means of a pivot pin.

12. In combination with a device comprising a plane triangular member having scale demarcations along two edges which meet at an apex, first plane elongated member having scaled demarcations thereon being mounted at said apex for pivotal movement in a plane parallel to the plane of said triangular member, and two similar elongated plane members having scaled demarcations thereon which are pivotally attached both to said first elongated member at the positions of the demarcations on said similar members and in a plane parallel to said first elongated members so that said similar members are pivotally movable in a plane parallel to said triangular member with one end of each of said similar members resting on one of said edges of said triangular member; apparatus comprising cradle means pivotally mounted for movement in a given direction, means for mounting a wheel on said cradle means for rotation so that the faces of the wheel are perpendicular to said given direction, and deflection indicating means attached to said cradle means for indicating only the maximum deflection of said cradle means in said given direction when said wheel is rotated.

* * * * *